United States Patent

[11] 3,584,936

| | | |
|---|---|---|
| [72] | Inventor | Herman Lowenthal<br>Chicago, Ill. |
| [21] | Appl. No. | 873,475 |
| [22] | Filed | Nov. 3, 1969 |
| [45] | Patented | June 15, 1971 |
| [73] | Assignee | General Scientific Corporation<br>Chicago, Ill. |

[54] SYMMETRICAL TRIPLET LENS SYSTEM FOR PHOTOCOPYING APPARATUS
1 Claim, 1 Drawing Fig.

[52] U.S. Cl. .................................................. 350/226
[51] Int. Cl. .................................................. G02b 9/16
[50] Field of Search ...................................... 350/226

[56] References Cited
UNITED STATES PATENTS
| | | | |
|---|---|---|---|
| 2,645,157 | 7/1953 | Lowenthal | 350/226 |
| 3,202,051 | 8/1965 | Bechtold | 350/226 |
| 3,237,520 | 3/1966 | Rickless et al. | 350/226 |

Primary Examiner—David Schonberg
Assistant Examiner—Paul A. Sacher
Attorney—Prangley, Clayton, Mullin, Dithmar & Vogel ABSTRACT: A symmetrical triplet lens system for photocopying apparatus characterized by the use of low cost materials and low cost steps in manufacturing. The two outside lens elements have a like index of refraction falling in the range from 1.59 to 1.63, and the inside lens element has an index of refraction falling in the range from 1.58 to 1.62. The lens system is designed primarily for 1 to 1 magnification, and is substantially free of coma, distortion and chromatic difference of magnification. The system also is well corrected for spherical aberration. The construction of the disclosed lens system readily is apparent from the tables hereinafter.

PATENTED JUN 15 1971 3,584,936
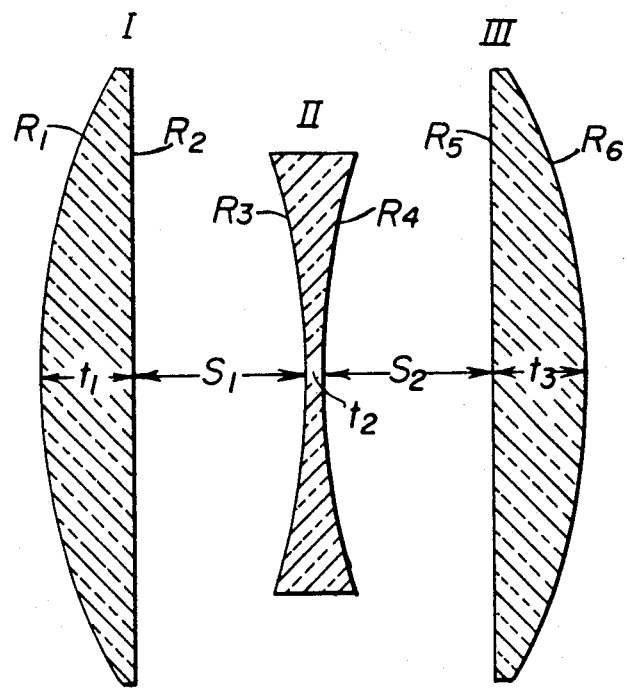
INVENTOR
HERMAN LOWENTHAL
BY Prangley, Clayton, Mullin,
Dithmar & Vogel.
ATTYS.

SYMMETRICAL TRIPLET LENS SYSTEM FOR PHOTOCOPYING APPARATUS

BACKGROUND OF THE INVENTION

This invention relates to a symmetrical triplet lens system for photocopying apparatus, and more particularly to such a system which can be manufactured and sold at a sufficiently low price to render the lens system usable in low cost photocopying apparatus.

As is well known, the field of photocopying apparatus is highly competitive at the present time, and manufacturers of photocopying apparatus are finding it increasingly necessary to reduce cost wherever possible in order to remain competitive and in business. The lens system used in such apparatus constitutes a major cost item, and constant pressure has been exerted on manufacturers of lens systems to reduce costs as much as possible.

The closest prior art to the present development known to applicant is the symmetrical three element lens system shown in U.S. Pat. No. 3,202,051. The present lens system represents an improvement in quality over the lens system of the patent, and, in addition, is a lens system which can be manufactured and sold at lower cost. In particular, the glasses used in the lens element of the present lens system have lower indices of refraction than those in the lens system of the patent, and thus are less costly and subject to more economical manufacturing steps.

SUMMARY OF THE INVENTION

The lens system of the invention is characterized by the use of glasses having relatively low indices of refraction, the index of refraction of the two outside lens elements of the triplet lens system being the same and falling in the range of 1.59 to 1.63. The index of refraction of the center lens element also is comparatively low, falling in the range of from 1.58 to 1.62. The Abbe V numbers for the outside lens elements are the same and greater than 59.0, and for the inside lens element greater than 39.0.

The Petzval sum in the new lens system is comparatively low, and for a lens system of unity focal length has a value of 0.378. This low value contributes to improved correction for curvature of field and astigmatism over a 20° half-angle.

The design of the present lens system is such that the sum of reduced thicknesses $(t_1/N_1+s_1+t_2/N_2+s_2+t_3/N_3)$ has a value greater than 0.27 for unity focal length. The powers of the lens elements in combination with the longer reduced thickness and the selection of the indices of refraction contribute to the aforesaid reduction in Petzval sum.

The radii of the surfaces of the three lens elements fall in ranges set forth hereinafter.

The speed of the lens system at infinity is F:5.6 and at 1 to 1 is F:11.2. At intermediate magnifications, the F values vary between 5.6 and 11.2. The lens also can be used at F:4.5 at infinity, ranging to F:9.0 for 1 to 1 magnification.

As previously mentioned, the present lens system has high quality, more than enough for use in photocopying apparatus, and is subject to manufacture and sale at relatively low cost.

BRIEF DESCRIPTION OF THE DRAWING

The single FIGURE of the drawing is a diagrammatic view of a lens system embodying the invention, the radii, thicknesses and spacings being denoted by usual conventions.

DESCRIPTION OF THE PREFERRED EMBODIMENT

Referring to the drawing, and beginning with the first or front lens element I (upon which incident light falls), lens element I is formed of glass having an index of refraction $N_1$ falling in the range of from 1.59 to 1.63 and an Abbe V number greater than 59.0. The front surface $R_1$ of lens element I has a radius falling in the range of from +0.37F to +0.41F. The rear surface $R_2$ has a radius falling in the range of from −2.50F to −3.95F. As is conventional in denoting radii, the positive sign indicates a surface convex to the front and the negative sign a surface concave to the front. F is the effective focal length.

Central lens element II is formed of glass having an index of refraction falling in the range of from 1.58 to 1.62 and an Abbe V number greater than 39.0. The front surface $R_3$ of lens element II has a radius falling in the range of from −0.40F to −0.43F, and the radius of rear surface $R_4$ falls in the range of from +0.40F to +0.43F. Preferably the radii of surfaces $R_3$ and $R_4$ are identical.

Rear lens element III, like lens element I, is formed of glass having an index of refraction falling in the range of from 1.59 to 1.63 and an Abbe V number greater than 59.0. Preferably the same material is used in lens elements I AND III. Front surface $R_5$ of lens element III has a radius falling in the range of from +2.50F to +3.95F, and rear surface $R_6$ has a radius falling in the range of from −0.37F to −0.41F. Again, the values of the radii $R_5$ and $R_6$, apart from sign, preferably are the same as the values of the radii $R_2$ and $R_1$ of lens element I.

The lower index of refraction glasses used in the present lens system are more stable and less subject to staining and oxidation than the higher index glasses, and as a result the glasses can be manufactured less expensively than the higher index glasses. When the preferred symmetry of radii is used, the manufacturing cost of the lens system is less than would be the case of an asymmetrical lens system.

The lens system constructed in accordance with the foregoing is substantially free of coma, distortion and chromatic difference of magnification, the correction of these aberrations being due largely to the symmetrical design. The lens also is well corrected for spherical aberration.

Vignetting in the lens system is so slight as not to be a factor in the use of the lens in photocopying apparatus.

A preferred lens system embodying the invention is constructed as specified in the following table, such lens system having an effective focal length of 1.000 and a front and back focal distance of 0.825:

Element I
$R_1=+0.3907$
$t_1=0.0542$  $N_D=1.620$  $V=60.3$
$R_2=-3.4709$
$s_1=0.0995$
Element II
$R_3=-0.4153$
$t_2=0.0101$  $N_D=1.596$  $V=39.7$
$R_4=+0.4153$
$s_2=0.0995$
Element III
$R_5=+3.4709$
$t_3=0.0542$  $N_D=1.620$  $V=60.3$
$R_6=-0.3907$ In the above table the plus and minus signs respectively indicate that the denoted lens element surface is convex or concave to the front of the lens system, $t$ is lens element thickness, $s$ is spacing between lens elements, $N_D$ is index of refraction and $V$ is Abbe V number.

The lens system of the above table has a speed at infinity of F:5.6 and at 1 to 1 magnification of F:11.2. The speed at intermediate magnifications have F values between 5.6 and 11.2.

The Petzval sum of the lens system constructed in accordance with the data shown in the above table has a comparatively low value of 0.378, thereby providing improved correction for curvature of field and astigmatism over a 20° half-angle.

The powers of the individual lens elements are selected in order to have a sum of reduced thicknesses greater than 0.27F. Thus, $t_1/N_1+s_1+t_2/N_2+s+t_3/N_3$ is greater than 0.27. The selected powers in combination with the longer reduced thickness and the selection of the indices of refraction contribute to the comparatively low Petzval sum.

From the above description it is thought that the construction and advantages of this invention will be readily apparent

Having thus described the invention, what I claim as new and desire to secure by Letters Patent is:

1. A symmetrical triplet lens system for photocopying apparatus comprising:
   a pair of outside lens elements I and III, and
   inside lens element II,
   said lens system having substantially the following specifications for an effective focal length of 1.000:

Element I
   $R_1=+0.3907$
   $t_1=0.0542$    $N_D=1.620$    $V=60.3$
   $R_2=-3.4709$
   $s_1=0.0995$
   Element II
   $R_3=-0.4153$
   $t_2=0.0101$    $N_D=1.596$    $V=39.7$
   $R_4=+0.4153$
   $s_2=0.0995$
   Element III
   $R_5=+3.4709$
   $t_3=0.0542$    $N_D=1.620$    $V=60.3$
   $R_6=-0.3907$ where the plus and minus signs respectively indicate that the denoted surface is convex or concave to the front of the lens system, $t$ is lens element thickness, $s$ is spacing between lens elements, $N_D$ is index of refraction and $V$ is Abbe V number.